Jan. 22, 1952

M. KADENACY 2,583,430

POWER PLANT, INCLUDING A COMBUSTION CHAMBER
AND AN IMPULSE TURBINE DRIVEN BY
EXHAUST GASES FROM THE CHAMBER

Filed May 17, 1945

INVENTOR
Michel Kadenacy
BY
Pennie Davis Marvin & Edmonds
ATTORNEYS

Jan. 22, 1952     M. KADENACY     2,583,430
POWER PLANT, INCLUDING A COMBUSTION CHAMBER
AND AN IMPULSE TURBINE DRIVEN BY
EXHAUST GASES FROM THE CHAMBER

Filed May 17, 1945     6 Sheets-Sheet 2

INVENTOR
Michel Kadenacy
BY
Pennie Davis Marvin Edmonds
ATTORNEYS

Jan. 22, 1952     M. KADENACY     2,583,430
POWER PLANT, INCLUDING A COMBUSTION CHAMBER
AND AN IMPULSE TURBINE DRIVEN BY
EXHAUST GASES FROM THE CHAMBER

Filed May 17, 1945                                        6 Sheets-Sheet 3

INVENTOR
Michel Kadenacy
BY
Pennie Davis Marvin Edmonds
ATTORNEYS

Fig. 10

Patented Jan. 22, 1952

2,583,430

UNITED STATES PATENT OFFICE 2,583,430

POWER PLANT, INCLUDING A COMBUSTION CHAMBER AND AN IMPULSE TURBINE DRIVEN BY EXHAUST GASES FROM THE CHAMBER

Michel Kadenacy, Summit, N. J.; Nina K. Guercken executrix of said Michel Kadenacy, deceased Application May 17, 1945, Serial No. 594,327

4 Claims. (Cl. 60—32)

This invention relates to power generating installations of the kind which includes a gas turbine of the constant volume explosive combustion type, and is concerned more particularly with a novel method and apparatus for utilizing the energy in exhaust gases produced by the burning of successive charges of a combustible mixture in a chamber, the volume of which remains constant or substantially constant during the exhaust of the burned gases and the inlet of fresh gaseous charges.

In the practice of the method of the invention by the new apparatus, the exhaust of burned gases from and the introduction of fresh charges into the combustion chamber are carried on in such manner as to utilize the phenomena of explosive exhaust and implosive inlet, respectively, and the chamber is, therefore, self-cleaning and self-charging so that it need not be supplied with air or gas under pressure for scavenging and charging purposes. The burned gases leave the chamber in a mass at high velocity and, during their movement away from the chamber, the dynamic energy of the gases is utilized to drive a turbine. This turbine, which is one of the novel features of the invention, is so located with reference to the chamber and is so constructed that the rotation of the turbine wheel by the impulse action of the gases not only does not interfere with the operation of the chamber in such manner as to utilize the phenomena of explosive exhaust and implosive inlet, but, instead, facilitates the utilization of those phenomena. The turbine wheel driven by the gases may be employed to do work and, in addition, the gases are collected under pressure beyond the turbine and then employed to do work by their expansion.

In a number of my prior patents, such as Nos. 2,102,559, 2,123,569, 2,130,721, 2,131,959, and 2,144,065, I have disclosed how a two cycle internal combustion engine should be constructed and operated in order that it may utilize the phenomena of explosive exhaust and implosive inlet, and the instruction of the patents applies equally to the construction and operation of the combustion chamber of an explosive combustion gas turbine. In an engine functioning to utilize explosive exhaust, as explained in those patents, upon the opening of the exhaust orifice to the proper extent in the proper time interval, the burned gases within the cylinder react upon the cylinder walls so that their mass is accelerated in a direction out of the cylinder through the orifice. The speed attained by the mass of burned gases then increases until the momentum of the mass finally becomes so great that the mass ceases to react upon the cylinder walls. At that instant, the period of acceleration of the mass of burned gases comes to an end and the mass continues to move out of and away from the cylinder at high speed by virtue of its momentum. During the period of acceleration, the mass of burned gases in its explosive exhaust pushes and accelerates the inert gas lying in its path in the exhaust conduit adjacent the exhaust orifice of the cylinder, and the mass of inert gas thus pushed and accelerated is incorporated into the mass of burned gases producing the acceleration. The combined masses of burned gases and of inert gas accelerated thereby during the period of acceleration of the burned gases, which may, for convenience, be referred to as the exhaust gas mass and consists of the burned gases and the inert gas lying between the burned gases and the acceleration front traveling through the inert gas, has its greatest speed and momentum in the explosive exhaust process at the moment when the burned gases start to leave the cylinder as a mass, which occurs when the period of acceleration of the exhaust gas mass is ended by the termination of the reaction of the burned gases against the cylinder walls. Accordingly, at the end of the acceleration period, the exhaust gas mass has its greatest dynamic energy.

The propagation speed of the acceleration front through the inert gas in the exhaust gas conduit adjacent the exhaust orifice during the acceleration of the burned gases is of the order of from 2000 to 4000 feet per second, and may be much higher. The speed with which the acceleration front travels depends upon the intensity of explosive discharge of the exhaust gases from the chamber, which in turn depends upon the quantity of energy liberated by the burning of the combustible mixture and contained in the burned gases. The intensity of explosive discharge also depends upon the shortness of the time within which a sufficiently large area of the exhaust orifice is opened to produce explosive exhaust, and upon the size of the mass of inert gas which must be accelerated simultaneously with the mass of burned gases. The speed of movement of the exhaust gas mass will vary in accordance with the factors above set forth, and in a practical installation, may be from a thousand to several thousand feet per second. The location of the acceleration front traveling through the inert gas may be determined by a cathode ray oscillograph or other suitable means.

As the exhaust gas mass travels through the exhaust gas conduit of the engine after the end of the acceleration period of the burned gases, it pushes, compresses, and displaces the mass of inert gas in its path, and the speed and the dynamic energy of the exhaust gas mass decrease continuously because of the work so done. A traveling pressure front develops within the traveling exhaust gas mass and the inert gases acted on thereon, and, in that front, the dynamic energy of the exhaust gas mass is being transformed into potential energy of gas pressure. At the moment the exhaust gas mass has lost all its dynamic energy, a static rebounding pressure front is formed and that front immediately explodes, with the result that part of the gas, including the burned gases, which took part in the formation of the static pressure front, is projected backward toward the cylinder. The exhaust gas mass may, accordingly, be thought of as rebounding from the exploding static pressure front to the cylinder. If the exhaust orifice is closed before the mass of rebounding gas reaches the cylinder, the returning gases are kept from entering the cylinder, and, therefore, cannot act adversely upon the contents thereof. The mass movement of the gases from the cylinder by explosive exhaust, accordingly, tends to leave the cylinder empty, so that it is not necessary, as in engines not utilizing explosive exhaust, to supply air or gas under pressure to the cylinder for scavenging or cleaning purposes.

The phenomenon of implosive inlet is similar in nature to that of explosive exhaust in that, in each case, a medium at one pressure explosively enters a space containing a medium at a lower pressure. In explosive exhaust, the burned gases within the cylinder have an initial pressure higher than the inert gas within the exhaust gas conduit, while, in implosive inlet, the air or combustible mixture outside the cylinder is at atmospheric pressure or higher and it enters a void within the cylinder. Because of the similarity between the phenomena, it is necessary, in order to utilize implosive inlet satisfactorily for recharging the cylinder, to open the inlet orifice in substantially the same manner in which the exhaust orifice is opened to obtain explosive exhaust.

In my co-pending application Serial No. 588,189, filed April 13, 1945, I have disclosed a power plant including a constant volume gas turbine having a combustion chamber in which successive charges of a combustible mixture are burned. The chamber operates in such manner as to utilize explosive exhaust and implosive inlet, and the exhaust gases issuing from the chamber pass through an exhaust conduit leading to a receiver. This conduit is of such transverse shape and cross-sectional area that the mass of exhaust gases leaving the chamber displaces inert gases within the conduit ahead of it for a considerable distance through the conduit before a static rebounding pressure front develops and explodes. Either the exhaust orifice or the inlet orifice is closed before the gases rebounding from the static pressure front reach the exhaust orifice, and the gases are thus collected in the conduit and receiver under pressure and may be used to do work by their expansion. For this purpose, the receiver is connected to the inlet of a turbine and the stored gases rotate the turbine wheel on their way to the atmosphere.

In any such installation as that disclosed in the co-pending application, it is advantageous to obtain maximum acceleration of the exhaust gas masses in order that the masses may acquire maximum velocity and maximum dynamic energy. Any decrease in the amount of explosive energy available to accelerate the exhaust gas masses will result in a decrease in the velocity with which the masses of burned gases leave the chamber, and this will be adverse to the proper self-cleaning of the chamber and refilling thereof by the action of the gas alone. To avoid reduction in the amount of explosive energy available to accelerate an exhaust gas mass, it is advantageous to decrease the mass of inert gases in the exhaust conduit in the vicinity of the exhaust orifice at the time that a mass of burned gases within the chamber starts its explosive exhaust. However, in the installation of the co-pending application in which the expansion of exhaust gases stored under pressure within the exhaust gas conduit and receiver is used to drive a turbine, it is advantageous to increase the pressure of the stored gases in order to increase the output of the turbine. Such an increase in the pressure of the stored gases will in turn increase the magnitude of the mass of inert gases opposing the burned gases during their acceleration, and hence, decrease their speed and momentum. It is apparent, therefore, that, in such an installation, the pressure of the stored gases must not be allowed to exceed a predetermined value in order that those gases will not prevent the exhaust gas masses from acquiring an acceleration and momentum suitable to insure satisfactory utilization of explosive exhaust and implosive inlet, and these conditions limit the output of the turbine.

The present invention is directed to the provision of a power plant including a combustion chamber of constant or substantially constant volume, in which successive charges of a combustible mixture are burned. Explosive exhaust of the burned gases is utilized for cleaning the chamber and implosive inlet is utilized for recharging the chamber. In the new power plant, dynamic energy is abstracted from the exhaust gases as they travel outwardly away from the chamber at ballistic speed through an exhaust gas conduit to the point where a static rebounding pressure front develops and explodes. For the purpose of utilizing the dynamic energy of the explosively projected exhaust gases, an impulse turbine of novel construction is installed in the path of travel of the gases and, as they pass through the turbine at high velocity, they rotate the turbine wheel at high peripheral speed. The turbine is installed between the exhaust orifice of the chamber and the place of explosion of the static rebounding pressure front and, for optimum results, the turbine wheel is located substantially at the point that has been reached by the acceleration front traveling through inert gases in the exhaust gas conduit at the instant that the burned gases cease to react against the chamber walls and begin to leave the chamber explosively in a mass. The position of the acceleration front at the instant that the burned gases stop reacting against the chamber walls and the period of acceleration of the gases ends, is at the leading end of the exhaust gas mass and, by placing the wheel at that point, the wheel begins to receive an impulse from the exhaust gas mass at the time that the mass has its maximum speed and momentum. Also, each exhaust gas mass will pass entirely through the wheel and will act on it without reaction against the walls of the chamber and at the time that the dynamic energy of the mass is at a maximum. The speed imparted to the wheel will, accordingly, be at a maximum.

The turbine of the new power plant is of novel construction and forms part of the invention. The turbine is so constructed and disposed that the successive exhaust gas masses pass entirely through it and the point where the static rebounding pressure front in the gases forms and explodes is well beyond it. Also, the turbine abstracts only a selected part of the dynamic energy from the gases passing through it and the dynamic energy retained by the gases is sufficient to enable them to push inert gases out of the outlet of the turbine toward a receiver connected directly to the outlet or through a suitable conduit. The static rebounding pressure front then explodes in the gases at a point well beyond the turbine outlet and either in the receiver or in the conduit leading thereto. If desired, however, the gases from the turbine may be discharged into the atmosphere directly or through a conduit, in which event the point of explosion of the rebounding pressure front is beyond the turbine outlet and either in the conduit or in the atmosphere beyond it.

The impulse turbine in the new power plant keeps the mass of gases rebounding from the pressure front and the gases stored under pressure beyond the turbine from passing backward through the turbine. For this purpose, the turbine is constructed and arranged to develop centrifugal forces in the masses of gases passing through it, which oppose the pressure of gases trapped inside the exhaust receiver and the conduit between the turbine outlet and the receiver and keep such gases from rebounding or expanding back through the turbine to the exhaust gas conduit leading to the combustion chamber. In order to develop such centrifugal forces by the high speed rotation of the turbine wheel, the inlet passage to the wheel lies at about the center of rotation of the wheel and the passages through the buckets extend generally radially to the outlet from the wheel.

The turbine may alternatively be so arranged that the buckets of the wheel have an axial deflecting action which prevents the rebounding gases or those trapped under pressure inside the receiver and the conduit between the turbine outlet and the receiver from returning through the turbine to the exhaust gas conduit leading to the chamber. For this purpose, the buckets may be arranged relatively close to one another in one or more rows with a suitable stator arrangement, and have appropriate curvature and angle to develop axial or deflection forces in the masses of gases passing through the turbine, which are effective for the purpose mentioned. In order to keep the gases trapped beyond the turbine, both centrifugal forces and axial deflection forces developed by the rotation of the wheel may be utilized.

The turbine wheel maintained in high speed rotation by the exhaust gas masses successively acting upon it by impulse action, performs a further function in that it operates between successive impulses to produce a suction effect in its inlet passage at the time the exhaust orifice is closed. As a result of this action, inlet gases which have entered the exhaust gas conduit during the time that the exhaust and inlet orifices are simultaneously open, are drawn through the turbine after each explosive exhaust, and the mass of inert gases present in the conduit is reduced and, accordingly, offers less resistance to the following explosive exhaust. The exhaust gas mass leaving the chamber during such following explosive exhaust, therefore, acquires a higher speed. The increase in the speed of the mass of burned gases leaving the chamber enhances the self-cleaning effect and the following recharging by implosive inlet is correspondingly improved. By reason of the easier acceleration of the burned gases and the greater efficacy of transformation of the potential energy of the combustible mixture into dynamic energy of the burned gases under the conditions described, the dynamic energy available for operating the turbine, creating the static rebounding pressure front, and compressing the stored gas is increased, because of the less amount of such energy transmitted to inert gases in the exhaust gas conduit before the exhaust gas mass acts on the turbine wheel.

The action of the turbine wheel in high speed rotation in preventing the return of exhaust gases through the turbine to the exhaust gas conduit between the turbine and the exhaust orifice provides time within which the exhaust orifice may be closed without danger of interfering with implosive inlet of the new charge. During the inlet period when both exhaust and inlet orifices are open, a part of the fresh gas passes through the combustion chamber and enters the exhaust gas conduit behind the exhaust gas mass traveling to the impulse turbine. When the chamber is supplied with a charge under pressure in order to raise the pressure level throughout the power plant, the fresh gas entering the exhaust gas conduit would, if allowed to remain there, offer substantial resistance to acceleration of the succeeding mass of burned gases within the chamber. However, the turbine wheel draws out such gases from the exhaust gas conduit and thus lowers the mass of the inert gases therein and, accordingly, lowers the resistance offered thereby. Because of the void in the exhaust gas conduit left behind each exhaust gas mass traveling therethrough and of the suction effect of the turbine wheel, it is desirable to close the inlet orifice after the exhaust orifice, in order that part of the fresh charge may not be drawn out of the chamber by suction through the open exhaust orifice after the inlet orifice is closed. The chamber may be supercharged with fresh gas, however, by using the inlet arrangement and practicing the method set forth in my U. S. Patent No. 2,281,585.

As explained in my prior patents above identified, it is advantageous, in the operation of a combustion chamber utilizing the phenomenon of explosive exhaust to decrease the masses of inert gases lying in the path of movement of the burned gases during the time when the burned gases are undergoing acceleration, in order that such acceleration may approach the maximum. To insure that the masses of inert gases may offer the minimum resistance to outward travel of the burned gases as a mass from the combustion chamber per unit length of such travel, the exhaust gas conduit leading from the exhaust port of the chamber should not be too big, because the conduit would contain too great a volume of inert gases and the gases would offer too much resistance. Also, the conduit should not be too small, because it would restrict the passage of the gas masses therethrough. For best results, the conduit should have a cross-sectional area at its end adjacent the port which is substantially equal to the total area of the exhaust orifices opened at the time when the burned gases leave the chamber as a mass. Also, the cross-sectional shape of the conduit should be approximately the same as that of the exhaust port, and the inner surface of the conduit should be smooth and, preferably, polished. The cross-sectional area of the conduit may increase slightly, either gradually or in steps, toward its end connected to the turbine and the conduit is preferably straight, although it may be curved somewhat, provided it does not present to the outwardly moving masses of gases any surfaces capable of reflecting such masses back toward the chamber or impeding their movement away from the chamber, so that the static pressure front within the gases will explode at a point nearer the chamber as a result. A conduit fulfilling these requirements may be said to provide a "free passage" for the masses of exhaust gases, since the only resistance which the exhaust gas masses encounter in their travel through such a conduit is that offered by the inert gases within the conduit, and the conduit contains the minimum permissible volume of such inert gases per unit of length.

In the new turbine, the inlet to the turbine, the gas passage between the buckets of the turbine wheel, and the outlet from the turbine are constructed to form a prolongation of the exhaust gas conduit and there is, thus, a free passage for the gases through the turbine. For this purpose, the cross-sectional area of the inlet should be substantially the same as that of the end of the exhaust conduit connected to the inlet, and the cross-sectional area of the gas passage between the buckets of the turbine wheel and the cross-sectional area of the outlet should be the same as that of the inlet, although the free passage through the turbine may increase gradually in size, as in the case of the exhaust conduit. Also, the buckets of the turbine wheel and the walls of the inlet and of the outlet are so formed that they will not present any surfaces to the gases passing through the turbine from which the gases may rebound toward the chamber. With such an arrangement, the volume of inert gases displaced by the exhaust gas masses per unit of travel of the latter through the conduit and the turbine will be substantially constant, the inert gases will offer approximately minimum resistance to their displacement by the exhaust gas masses, and the point of explosion of the static rebounding pressure front will lie beyond the turbine outlet.

The receiver in which the exhaust gases are stored under pressure may be connected directly to the outlet of the impulse turbine, in which event the wheel may be installed inside the receiver and the static rebounding pressure front will form and explode within the gases contained in the receiver beyond the outlet from the wheel. The turbine outlet may, if preferred, be connected to the exhaust gas receiver by a passage, and, in that case, the static rebounding front may explode inside either the passage or the receiver. Any such passage connected to the turbine outlet should not be so formed as to contain an increased volume of inert gases lying in the path of the exhaust gas masses passing through it and should, therefore, have a cross-sectional area substantially the same as the respective cross-sectional areas of the turbine inlet, the passage through the wheel, and the turbine outlet. Similarly, the exhaust gas passage is preferably straight, but it may be curved, provided it presents to the gases traveling through it no surfaces from which the gases could rebound toward the turbine or by which their movement through the passage would be impeded, with the result that the rebounding pressure front would be formed within the passage through the wheel or in the outlet from the wheel.

An essential feature of the new installation is that the static rebounding pressure front explodes at a point well beyond the turbine, and the exhaust gas conduit leading from the combustion chamber or cylinder, the turbine inlet, the passage through the turbine wheel, the turbine outlet, and the exhaust gas passage leading from the outlet are, accordingly, all constructed to provide a free passage of the exhaust gas masses therethrough. For this purpose, as above pointed out, the exhaust gas conduit, etc., are all formed to permit travel of the exhaust gas masses therethrough against a minimum resistance offered by inert gases lying in the path of travel per unit length of such travel.

In an installation in which gases which have given up dynamic energy to the impulse turbine wheel are collected in a receiver and then employed to do work by their expansion, the volume of the receiver and of the exhaust gas passage leading to the receiver from the outlet of the impulse turbine should be great enough so that the gases stored therein exert a damping effect upon the oscillations produced by the hammering action of the successive exhaust gas masses entering the receiver at high speed. Such damping is desirable in order that the turbine operated by expansion of the stored gases may run more smoothly and thus have a better output. The damping effect may also be produced by the use of well-known expedients, such as muffling means or perforated walls through which the gases pass on their way from the place of explosion of the static rebounding pressure front to the expansion turbine.

The amount of dynamic energy taken from the explosively exhausted burned gases by the impulse turbine may be varied depending upon the construction of the turbine wheel. If desired, the greater part of the dynamic energy may be abstracted from the burned gases by the turbine, but the gases which have passed through the turbine retain sufficient energy to push the inert gas out of the turbine outlet and the exhaust gas passage beyond the turbine, so that the static rebounding pressure front explodes beyond the turbine.

Because of the high speed of the movement of the exhaust gas mass in explosive exhaust, the impulse turbine wheel operates at a very high peripheral speed, and with a high speed of rotation. The turbine may drive a centrifugal or axial blower or compressor directly coupled thereto, and part or all of the compressed air thus produced may be used to supercharge the combustion chamber or cylinder of the power plant. The exhaust gases trapped and stored beyond the impulse turbine may be used to drive a second turbine with both turbines doing useful work. The power developed by both turbines may then be utilized separately or jointly, and the turbine wheels of the two turbines may be mounted on a common shaft or on separate shafts.

The new power plant may include a single combustion chamber or cylinder connected through an exhaust gas conduit to an impulse turbine wheel, or, if desired, the wheel may be driven by exhaust gases from more than one chamber or cylinder. As disclosed in my prior Patent 2,130,721 and my co-pending application Serial No. 588,188, filed April 13, 1945, two to four chambers or cylinders may be connected to a common exhaust gas manifold, which is, in turn, connected by an exhaust gas conduit to the inlet of the impulse turbine wheel, provided the operation of the chambers or cylinders is properly timed. If the power plant includes a multi-cylinder engine, such as one having six or nine cylinders, the cylinders may be connected in groups to separate exhaust gas manifolds, which are, in turn, connected by separate exhaust gas conduits to separate inlets to the turbine, or each chamber or cylinder may be connected by a separate conduit to a separate inlet to the turbine. In such installations, the turbine inlets must be disposed in such manner as to avoid the passage of exhaust gas from one conduit to another, or the transmission of impulses from the exhaust gas in one conduit to that in another. By proper arrangement of the turbine inlets, the impulses from the exhaust gas in one conduit can be transmitted to that in another only along a path extending through an inlet and the turbine wheel to the place of explosion of the static rebounding pressure front and thence back through the wheel to the adjacent inlet and its exhaust gas conduit. The centrifugal or axial forces developed by the turbine wheel in high speed rotation then prevent the return movement of the gas through the wheel and the passage of gas from one conduit to another.

In a constant volume turbine power plant constructed in accordance with the invention and including a group of combustion chambers, each combustion chamber may have its own exhaust gas conduit leading to the turbine, in which case the turbine is provided with a separate inlet for each such conduit and a separate gas passage between the buckets of the wheel. This arrangement may also be used in a plant in which the exhaust gases are obtained from an engine of the radial type. When the impulse turbine is actuated by the impulses of exhaust gas masses arriving through separate exhaust conduits and separate inlets, the corresponding passages of the gas through the wheel between the buckets thereof and the outlets from the wheel shou'd have respective cross-sectional areas equivalent to their corresponding inlets in order to provide a free passage for the gas masses through the wheel to the place of explosion of the static pressure front. When the turbine wheel is driven by exhaust gas masses arriving through separate inlets, the wheel may tend to vibrate as a result of the intermittent and unbalanced forces applied thereto, but this undesirable effect may be eliminated by making the wheel in the form of a slightly conical disc.

For a better understanding of the invention, reference may be made to the accompanying drawings, in which.

Figures 1, 2, 3:
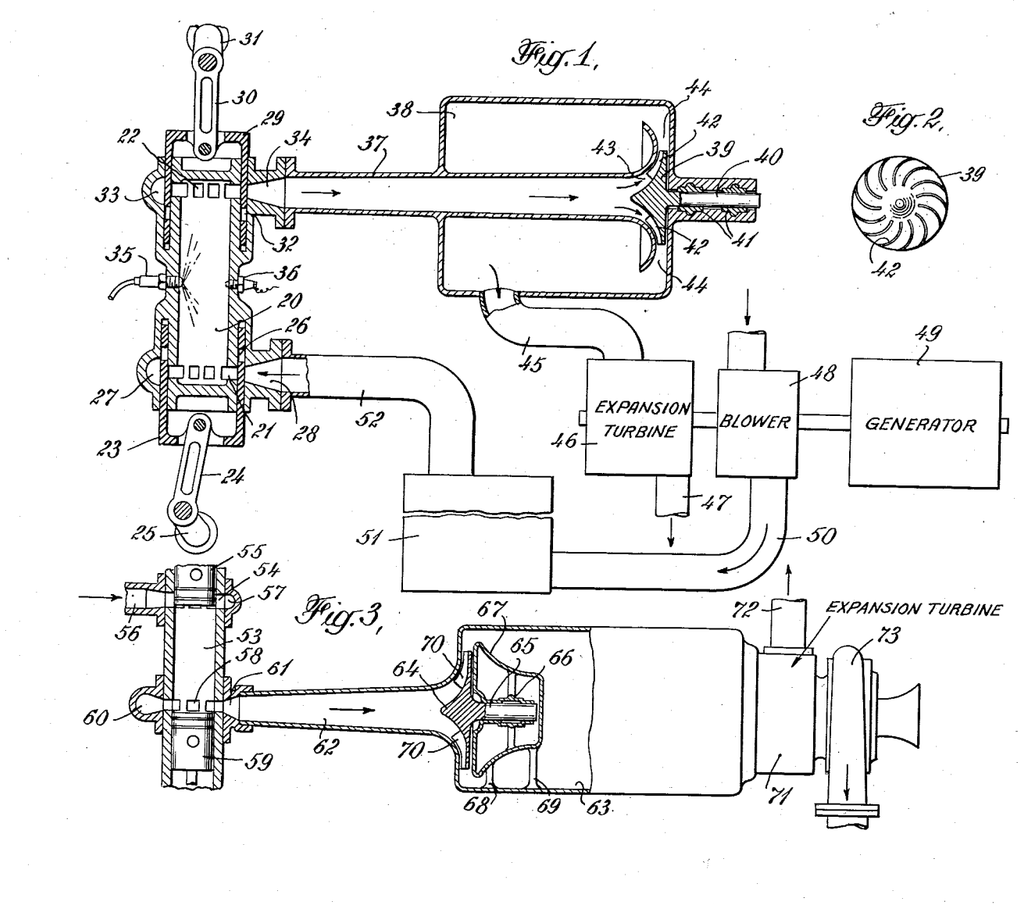
Fig. 1 is a diagrammatic view, partly in elevation and partly in longitudinal section, through a power plant embodying the invention.
Fig. 2 is a view in end elevation of the turbine wheel of the power plant of Fig. 1, looking from the left in Fig. 1.
Fig. 3 is a view of the same type as Fig. 1 but showing a power plant in which the exhaust gases operating the turbine are produced in a cylinder of a two cycle internal combustion engine of the opposed piston type.

The apparatus illustrated in Figs. 1 and 2 is a power plant constructed to embody the invention, which includes a constant volume combustion chamber 20 of elongated cylindrical form having inlet orifices 21 and exhaust orifices 22 at opposite ends thereof. The inlet orifices are controlled by a sleeve valve 23 actuated by a connecting rod 24 connected to a crank 25 on a suitable shaft. Valve 23 has openings 26 which can be brought into registry with orifices 21 by lengthwise movement of the valve, and communication is thereby established between the orifices and a passage 27 extending around the chamber and connected to an inlet port 28.

The exhaust orifices 22 are controlled by a sleeve valve 29 driven by a connecting rod 30 connected to a crank 31 on a suitable shaft. The valve is formed with ports 32 which may be brought in registry with the orifices 22 on lengthwise movement of the valve. A passage 33 encircling the chamber leads from the orifices to an exhaust port 34.

The chamber is provided with a nozzle 35 for injection of combustible material, and also with an ignition device 36, which may be a spark plug. If desired, the combustible material may be introduced with the fresh air and the combustible mixture in the chamber may be ignited by means other than the spark plug shown.

When the chamber is filled with a combustible mixture and the mixture has been ignited and burned, the valve 29 opens the exhaust orifices 22 to the desired extent and in the proper time interval to produce explosive exhaust of the burned gases through port 34 into an exhaust gas conduit 37 connected to the port. As previously explained, the conduit has a cross-sectional area substantially equal to the cross-sectional area of port 34 which, in turn, has a cross-secsectional area substantially equal to the total opened areas of orifices 22 at the time that the exhaust gases leave chamber 20 in a mass at ballistic speed. The conduit 37 thus provides a free passage for exhaust gas masses and it extends into a receiver 38. The end of the conduit within the receiver is outwardly flared and serves as part of the casing of an impulse turbine.

An impulse turbine wheel 39 is supported within receiver 38 close to an end wall thereof, which serves as another part of the turbine casing. The wheel is mounted on a shaft 40 running in bearings 41 attached to the end wall of the receiver, and the wheel is provided on its inner face with buckets 42 having the curved formation shown in Fig. 2. The wheel is of generally conical section and the buckets lie close to the surface of the flared end portion of the conduit. Exhaust gases passing through the conduit enter the turbine inlet 43, which is annular in form and is defined by the inner surface of the conduit and the opposed central surface of the wheel, and thence pass between the buckets. Beyond the buckets, the gases pass through the turbine outlet 44, which is annular in form and is defined by the flared end portion of the conduit 37 and the inner end wall of the receiver, and thence enter the main body of the receiver. The passage through the wheel is made up of passages between adjacent buckets and these passages are of substantially uniform cross-section from their inner ends to their outer ends and their total cross-sectional area is substantially equal to the cross-sectional area of conduit 37 at its end connected to inlet 43. For this purpose, the buckets lie closer together at their inner ends than at their outer ends (Fig. 2) and also (Fig. 1) the buckets have a greater height adjacent their inner ends than at their outer ends. The buckets are so constructed that they present no surfaces to the exhaust gas masses entering the casing from which those masses may rebound toward the chamber 20.

With the construction described, the successive exhaust gas masses explosively exhausted from the chamber travel through the exhaust gas conduit 37 and the impulse turbine, and in their travel, the masses accelerate, displace, and compress inert gases within the conduit and turbine. The turbine wheel is maintained in high speed rotation by the impulses received from the successive exhaust gas masses traveling through it. The gases issue from the turbine outlet and enter the receiver, where a static rebounding pressure front explodes at a distance from the turbine outlet. From this pressure front, the gases rebound toward the turbine wheel but cannot pass through it, because of the centrifugal action of the wheel. The gases are, accordingly, collected under pressure in the receiver.

The turbine wheel is disposed substantially at the point that has been reached by the acceleration front traveling through the inert gases in the exhaust gas conduit at the time that the burned gases within the combustion chamber have acquired their maximum acceleration, have stopped reacting upon the chamber walls, and have begun to leave the chamber in a mass. The wheel thus lies at the leading end of each exhaust gas mass at the time that the mass has been fully accelerated and begins its movement out of and away from the chamber. The gases acting on the wheel, accordingly, have their maximum dynamic energy and all of each exhaust gas mass acts on the wheel. While it is desirable that the turbine wheel lie at such a distance from the combustion chamber that an impulse begins to be applied to the wheel as soon as the mass of burned gases stops reacting upon the chamber walls, the wheel may be disposed somewhat nearer to or farther from the chamber without substantial loss of efficiency. The optimum location of the wheel is that above stated, and, ordinarily, it will not be difficult to place the wheel at the proper location.

The location of the point that has been reached by the acceleration front traveling through the inert gases in the exhaust gas conduit at the instant that the burned gases within the combustion chamber have begun to leave the chamber in a mass varies within limits depending upon a number of factors, including the relation of the area of the exhaust orifice of the combustion chamber to the cross-sectional area of the chamber, the rate at which the orifice is opened, and the energy available at the instant of explosive exhaust. Thus the location of the point cannot be defined in terms of the dimensions or mechanical characteristics of the combustion chamber or engine cylinder and no general formulae for determining the location of the point have been worked out. It is relatively simple, however, to determine the location of the point by an oscillograph, as follows.

An oscillograph operating in timed relation to the operation of the combustion chamber is set up to take a reading showing the instant that a void begins to develop in that part of the combustion chamber farthest from the exhaust orifice. The instrument thus gives the time interval from a zero point in the cycle of operations to the time that the void develops, that is, to the time that the gases start to leave the chamber as a mass. The oscillograph is next set up to take a pressure reading at a point along the exhaust pipe and the instrument shows the instant, when the acceleration front traveling through the pipe, passes the instrument and the interval between the zero point in the cycle and that instant. By changing the position of the oscillograph, it is not difficult to find a point along the pipe, which the acceleration front reaches in the same interval from the zero point that is required for the mass exit of the gases to begin. This point is the ideal location of the impulse turbine.

Between successive impulses from exhaust gas, the wheel continues high speed rotation by its momentum, and acts to draw from conduit 37 inlet gases which have entered the conduit while the exhaust and inlet valves were both open. Such inlet gases are discharged by the wheel into receiver 38. This suction action of the wheel produces desirable results above explained, in that it reduces the masses of inert gas in the conduit that would otherwise offer resistance to the acceleration of the burned gases within the chamber.

In the power plant under discussion, the turbine wheel 39 runs freely and is utilized only for the purposes of preventing gases rebounding from the static pressure front formed within receiver 38 and gases stored under pressure in the receiver from passing backward into conduit 37 and also of drawing inlet gases out of the conduit 37. The actuation of the turbine wheel for this purpose takes little of the dynamic energy of the exhaust gas and the major portion of the energy is utilized to keep the receiver full of gases under pressure, From receiver 38, a conduit 45 leads to a turbine 46 which is driven by the gases from the receiver in their expansion. The outlet 47 from the turbine may lead to the atmosphere or to a second turbine. Turbine 46 may drive a blower, generator, or other apparatus, and in the construction shown, blower 48 and generator 49 are both driven by the turbine. The compressed air produced by blower 48 is delivered through a conduit 50 to a receiver 51, from which a conduit 52 leads to the inlet port 28.

In the operation of the power plant described, the inlet valve 23 opens the inlet orifices 21 to the proper extent and in the proper time interval to cause compressed air from receiver 51 to be imploded into the combustion chamber. The inlet valve is so timed that the compressed air enters the chamber just after the burned gases therein have started to leave the chamber in a mass at high velocity and have left behind them a void adjacent the inlet orifices. While the combustion chamber may be charged with fresh air at atmospheric pressure, the use of compressed air from receiver 51 raises the pressure level throughout the entire system and thus makes possible increased output of turbine 46.

The power plant shown in Fig. 3 includes the cylinder 53 of a two cycle internal combustion engine of the opposed piston type. The cylinder is provided with inlet orifices 54 controlled by the upper piston 55, which is connected to a crankshaft in the usual way. An inlet conduit 56 for fresh gaseous charges leads to a passage 57 encircling the cylinder and in communication with the interior thereof, when the inlet orifices are open. The combustible material may be introduced into cylinder 53 with the air or separately as by a nozzle similar to nozzle 35 in Fig. 1. The combustible gaseous mixture within the cylinder is ignited in any suitable way, as, for example, by means of a spark plug similar to spark plug 36. At the opposite end of the cylinder from the inlet orifices, the cylinder is provided with exhaust orifices 58 which are controlled by lower piston 59 connected in the usual way to a crankshaft. The exhaust orifices lead to a passage 60 encircling the cylinder and provided with an exhaust port 61 to which an exhaust conduit 62 is connected.

The conduit 62 leads to a receiver 63 and an impulse turbine wheel 64 lies within the receiver at the end of the conduit. The wheel is mounted on a shaft 65 running in bearings 66 within a chamber 67 mounted within the receiver on supports 68, 69. The wheel 64 is provided with buckets 70 which lie close to the inner surface of an end wall of the receiver.

An expansion turbine 71 is mounted at the end of the receiver 63 opposite to that into which the exhaust conduit 62 leads, and the gases stored under pressure in the receiver pass through the expansion turbine and operate it on their way to the atmosphere through an outlet conduit 72. The expansion turbine may be used to drive any suitable machine, and, in the construction disclosed, the turbine drives a blower 73.

In the operation of the plant shown in Fig. 3, after the combustion of a charge within chamber 53, part of the energy contained in the burned gases is abstracted therefrom in expanding the chamber by outward movement of the pistons and in driving the shafts of the engine to which the pistons are connected. The energy remaining in the burned gases after the working strokes of the pistons is converted into dynamic energy, a part of which is utilized in driving the impulse turbine wheel 64. The energy retained by the gases which have passed through the wheel results in the formation of a static rebounding pressure front beyond the wheel in receiver 63, and the wheel serves to prevent backward movement of the gases through it into exhaust gas conduit 62. Also, the wheel draws out inlet gases from the conduit between successive explosive exhausts, so that the gases remaining therein will offer less resistance to the acceleration of the burned gases produced by combustion of the next charge. The wheel is disposed approximately at the critical location set forth in connection with the wheel 39 in the Fig. 1 construction. The gases stored under pressure within receiver 63 do work by their expansion in turbine 71, and in the installation illustrated, the expansion turbine drives a compressor. The compressed air may then be used for any desired purpose.

Figures 4, 5, 6, 7:
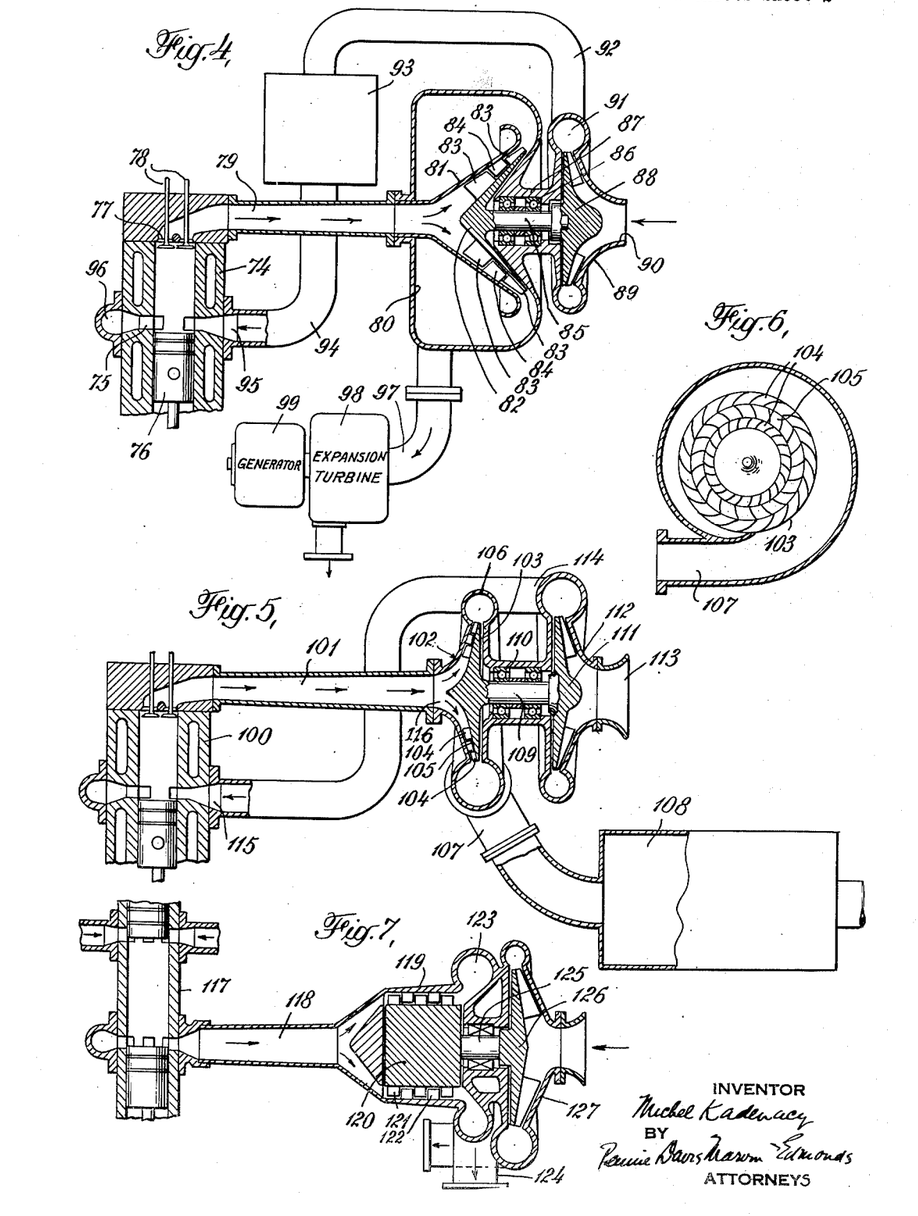
Fig. 4 is a view of the same type as Fig. 1 but showing an installation in which the impulse turbine is used to do work.
Fig. 5 is a view of the same type as Fig. 4 but showing a different type of impulse turbine.
Fig. 6 is a view showing the bucket construction of the turbine wheel employed in the Fig. 5 installation.
Fig. 7 is a view in longitudinal cross-section of an installation in which the turbine wheel is of the axial type.

The power plant shown in Fig. 4 includes an internal combustion engine having a cylinder 74 having inlet orifices 75 at one end, which are controlled by piston 76, and exhaust orifices 77 at the other end, which are controlled by poppet valves 78 actuated by any suitable means. The exhaust gases issuing through the orifices 77 travel through an exhaust gas conduit 79, which extends into a receiver 80 through one end thereof and is formed with a bell-shaped end 81 lying within the receiver adjacent its opposite end. A turbine wheel 82 of generally conical form extends into the end 81 of conduit 79, and it is provided with buckets 83 arranged in inner and outer rows. A row of stator elements 84 is mounted on the inner surface of the end 81 of the exhaust conduit between the two rows of buckets 83. The wheel 82 is mounted on a shaft 85 running in bearings 86 in a housing 87 secured to the end of receiver 80. The impeller 88 of a blower is mounted on the outer end of shaft 85 and operates within a housing 89 having an inlet 90 and an outlet 91. A conduit 92 connects the blower outlet 91 to a receiver 93 from which a conduit 94 leads to the inlet port 95 of the engine. The air passes from the port through an annular passage 96 to the inlet orifices 75.

In the installation of Fig. 4, the engine operates with explosive exhaust, and exhaust gases in explosive exhaust rotate the turbine wheel 82, and, upon issuing from the turbine wheel, enter receiver 80, in which the static rebounding pressure front explodes. The turbine wheel is approximately at the critical location above described and it prevents the return of the gases from the receiver into the exhaust gas conduit and also serves to draw inlet gases from the conduit and thus improve the explosive exhaust, as previously explained. The turbine wheel also drives the impeller 88 of the blower and thus performs useful work in compressing air for charging the engine cylinder above atmospheric pressure. Such compressed air enters the cylinder by implosive inlet.

The gases stored within receiver 80 are conducted through duct 97 to the inlet of an expansion turbine 98 connected to drive a generator 99 or other suitable machine. Thus, in the installation shown in Fig. 4, both turbines perform useful work. The impulse turbine wheel is so constructed as to abstract only part of the dynamic energy of the explosive exhaust gas and that energy is used to operate the blower connected to the turbine. The energy remaining in the gas is sufficient to produce the static rebounding pressure front exploding within receiver 80 adjacent the outlet from the turbine wheel. The passage of the gas through the turbine wheel into the receiver, which produces the static pressure front exploding within the receiver, keeps the receiver full of gases under pressure, and these gases drive turbine 98 by their expansion through it. The wheel 82 is of generally conical form and it produces centrifugal effects preventing the return of gases through it. At the same time, it is of sufficient structural rigidity to withstand the vibrations produced by the hammering action of the successive exhaust gas masses passing therethrough.

The installation shown in Fig. 5 includes a two cycle internal combustion engine 100 similar in construction and operation to that shown in Fig. 4. The explosively projected exhaust gases from the cylinder of the engine pass through an exhaust gas conduit 101 to an impulse turbine 102 containing a wheel 103 having rows of buckets 104 lying on opposite sides of a row of stator vanes 105 attached to the inner surface of the turbine casing. The outlet 106 of the turbine is connected by a conduit 107 to a receiver 108. Turbine wheel 103 is carried on one end of a shaft 109 rotatively mounted in bearings 110, and, at its other end, the shaft carries the impeller 111 of a blower 112 having an inlet 113. The wheel lies approximately at the critical location above described. Air compressed by the blower is conducted through a conduit 114 to the inlet port 115 of the engine 100.

While the power plants of Figs. 4 and 5 are generally similar, it will be observed that the impulse turbine of the Fig. 5 installation is connected by conduit 107 to receiver 108. The inlet 116 of the turbine, the passages between the buckets of turbine wheel 103, and the turbine outlet 106 are properly proportioned, as previously explained, so that exhaust gas masses passing therethrough encounter minimum resistance per unit length of travel from inert gases lying in their path. The conduit 107 is also of the proper cross-sectional area to achieve the same purpose and, in such an installation, the static rebounding pressure front may explode within conduit 107 or receiver 108. The gases stored under pressure in receiver 108 may be used for any desired purpose.

The power plant illustrated in Fig. 7 includes a two cycle internal combustion engine 117 of the opposed piston type and generally similar in construction and operation to that shown in Fig. 3. The exhaust gases explosively projected from the cylinder of the engine are conducted through an exhaust gas conduit 118 to a turbine 119 of the axial type. This turbine includes a rotor 120 lying approximately at the critical location above described and having widely spaced rows of buckets 121 between which lie stator vanes 122 attached to the inner wall of the turbine casing. The gases issuing from the passages between the buckets enter an outlet 123 and are thence led to a receiver, not shown, through a conduit 124. The turbine rotor is mounted on one end of a shaft 125 rotating in suitable bearings and carrying at its other end the impeller 126 of a blower 127. The compressed air from the blower may be used for any suitable purpose.

The turbine 119 is so constructed as to abstract only part of the dynamic energy of the exhaust gases passing therethrough, and the exhaust gases issuing from the outlet form a static rebounding pressure front which explodes either in the conduit 124 or in the receiver to which the conduit leads. The buckets 121 of turbine 119 are so constructed as to develop axial deflecting forces in the masses of gases passing therethrough, which prevent the return of the gases through the turbine into the exhaust gas conduit 88.

Figures 8, 9, 13, 14:
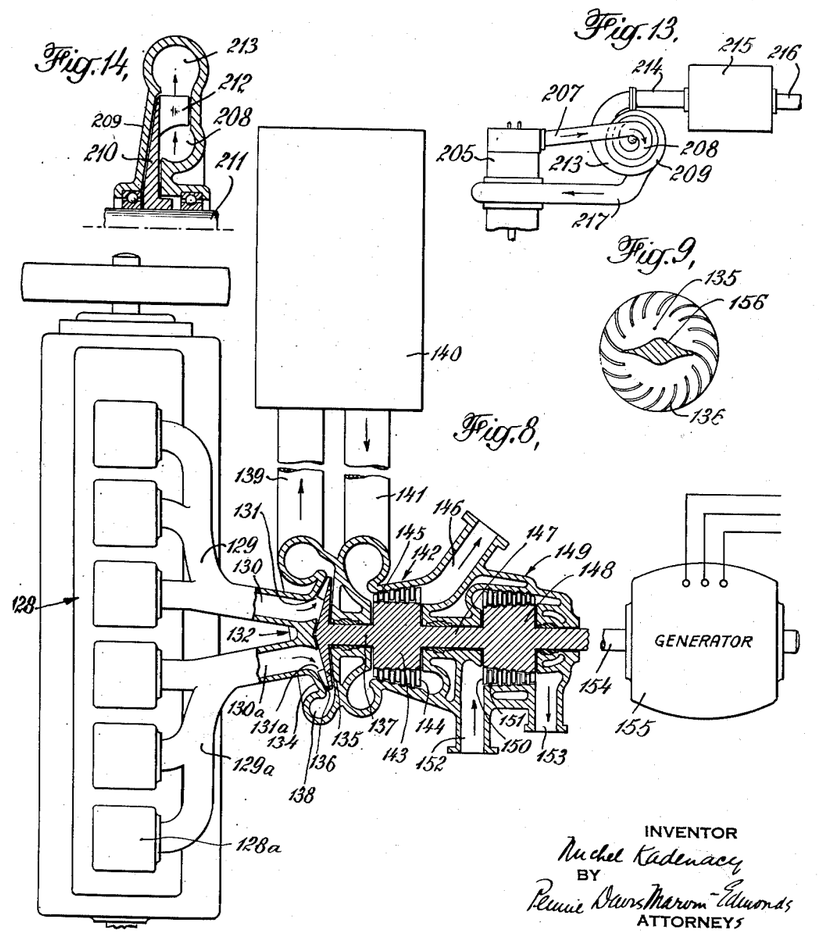
Fig. 8 is a view, partly in longitudinal section and partly in elevation, of an installation in which the impulse turbine is driven by exhaust gases delivered through a pair of exhaust gas conduits leading from separate groups of cylinders of an engine.
Fig. 9 is a view in front elevation of the wheel of the impulse turbine of Fig. 8 showing a part of the wall of the turbine inlets in section.
Fig. 13 is a view in side elevation of a power plant which includes a different form of impulse turbine.
Fig. 14 is a sectional view through part of the turbine of Fig. 13.

The power plant illustrated in Fig. 8 includes an internal combustion engine 128 of the two cycle type having six cylinders 128a arranged in two groups of three with the exhaust ports of the cylinders in each group connected to one of a pair of manifolds 129, 129a leading to respective exhaust gas conduits 130, 130a. The gases explosively projected from the cylinders of each group pass through one of the manifolds 129, 129a and the exhaust gas conduit 130 or 130a connected thereto to one of a pair of passages 131, 131a in the inlet member 132 of an impulse turbine. Passages 131, 131a are defined in part by the wall of the inlet member and in part by a transverse partition within the inlet member. The passages 131, 131a lead to the interior of a casing 134, within which is an impulse turbine wheel 135 provided with buckets 136 and lying approximately at the critical location above described. The turbine wheel is mounted on one end of a shaft 137 rotating in suitable bearings in an extension of casing 134. At the periphery of the turbine wheel, the casing is formed to provide an outlet 138 for the gases leaving the wheel and a pipe 139 leads from the outlet to a receiver 140. A pipe 141 leads from the receiver to the inlet of an expansion turbine 142, the casing of which may be formed integrally with casing 134, if desired. The expansion turbine has a rotor 143 mounted on shaft 137 and it is provided with rows of buckets 144 alternating with rows of stator vanes 145 attached to the inner wall of the expansion turbine casing. The gases which have passed through the expansion turbine are discharged through outlet 146.

In the power plant of Fig. 8, the rotor of the expansion turbine is connected by a shaft 147 mounted on suitable bearings to the rotor 148 of a compressor 149. The rotor is provided with rows of blades 150 alternating with rows of stator vanes 151 mounted on the inner wall of the compressor casing. The compressor has an inlet 152 and an outlet 153 and its rotor may be connected by a shaft 154 to the shaft of a generator 155.

As shown in Fig. 9, the transverse partition 156 across the interior of the inlet member subdivides the space within the member into the two inlets 131, 131a, each leading to the buckets carried by half the wheel 135. The total cross-sectional area of the passages between half the buckets on the wheel is then substantially equal to the transverse cross-sectional area of one of the inlets 131, 131a and the transverse cross-sectional area of each inlet is substantially equal to the corresponding area of the end of the exhaust gas conduit 130, 130a connected thereto. Each of the conduits 130, 130a has a cross-sectional area at its other end approximately that of the manifold 129, 129a connected thereto and the cross-sectional area of each manifold is substantially the same as the area of the exhaust port of each cylinder connected thereto, that is opened when the burned gases begin to leave that cylinder as a mass. Accordingly, each manifold, the exhaust gas conduit connected thereto, the turbine inlet to which the conduit leads, and the buckets on half the turbine wheel provide a continuous free passage for exhaust gas masses. The turbine outlet 138 and the pipe 139 are similarly formed and proportioned to provide a free passage for exhaust gas masses.

In the Fig. 8 power plant, the impulse turbine wheel is at substantially the point that has been reached by the acceleration front traveling through the inert gases in a manifold 129, 129a and the exhaust gas conduit 130, 130a connected thereto during each explosive exhaust from the middle cylinder 128a of a group, when the burned gas mass within that cylinder stops reacting upon the walls of that cylinder and begins to leave the cylinder as a mass. The turbine wheel, accordingly, begins to receive an impulse transmitted through the inert gases at the instant the burned gas mass starts to leave the cylinder as a mass, and all of each exhaust gas mass passes through the wheel. The distances along the path of travel of the exhaust gas masses from the inner and outer cylinders of each group to the wheel are, respectively, shorter and longer than the corresponding distance from the middle cylinder, but, because of the speed of travel of the acceleration front through the inert gases, the variations in the distances referred to are unimportant.

In the operation of the installation illustrated in Fig. 8, gases explosively projected through the exhaust gas conduits 130, 130a pass through respective inlets 131, 131a to the impulse turbine wheel 135 and impart a portion of their dynamic energy thereto. The dynamic energy of the gases after they have passed through the wheel is sufficient to permit the gases to enter pipe 139 and produce a static rebounding pressure front which explodes either in the pipe well beyond the outlet from the wheel or in receiver 140. The centrifugal action of the wheel is such as to prevent gases rebounding from the explosive pressure front or stored within pipe 139, receiver 140, and pipe 141 from passing backward through the wheel to the exhaust gas conduits 130, 130a, and the gases are, accordingly, stored under pressure in the pipes and receiver. The stored gases may escape from the pipes 139, 141 and receiver 140 through the expansion turbine 142 and the gases leaving that turbine are discharged through an outlet conduit 146 to the atmosphere or used for any desired purpose.

Both the impulse and expansion turbines cooperate in driving the impeller 148 of the compressor and also, if desired, the generator 155. If the turbine wheels of the impulse and expansion turbines of the installation are thus coupled together and to the impeller of the compressor, the expansion turbine wheel and the impeller must be constructed for high speed operation.

With the arrangement illustrated, a greater or less amount of the dynamic energy of the working gases may be utilized to operate the impulse turbine and the energy then available for providing gases stored under pressure for operation of the expansion turbine will vary accordingly. The receiver 140 is of such size that gases contained therein have a damping effect on the gases exploding from the rebounding pressure front toward the expansion turbine. By such damping action, smoother operation of the expansion turbine is obtained.

Figure 10:
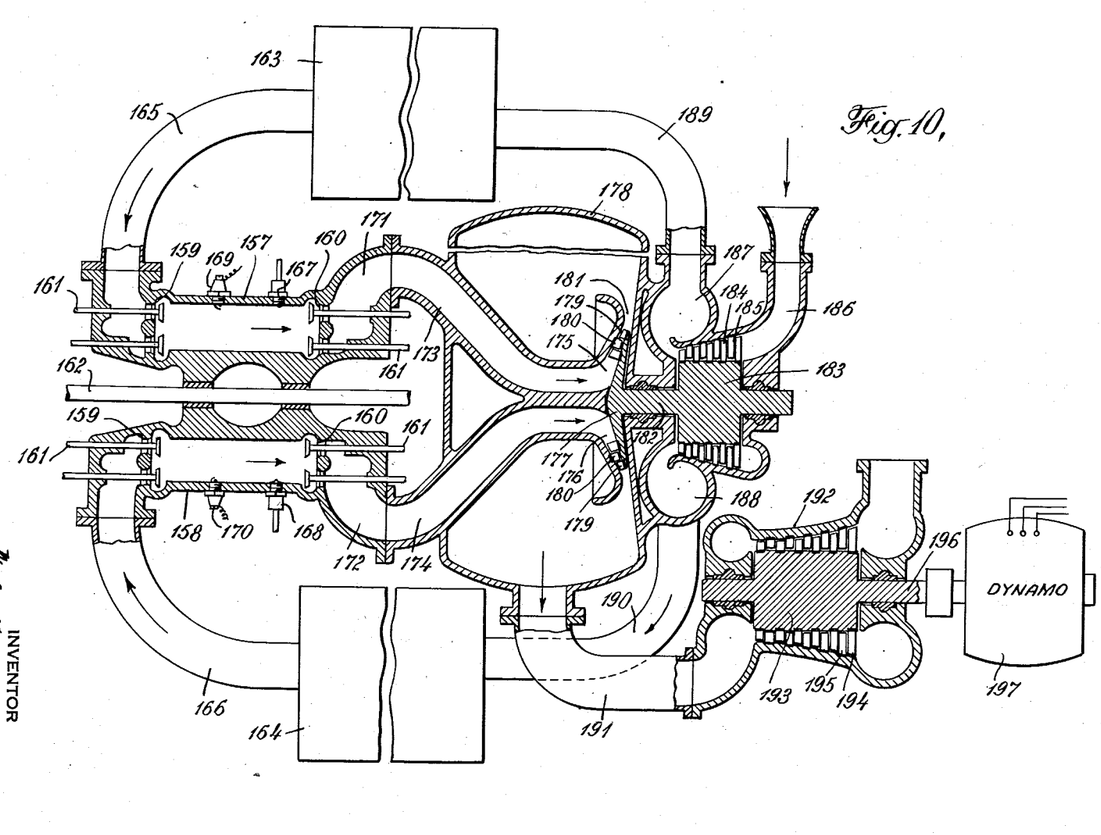
Fig. 10 is a view, partly in longitudinal section and partly in elevation, of a power plant installation including a plurality of combustion chambers.

The power plant shown in Fig 10 includes a pair of combustion chambers 157, 158 having inlet orifices 159 and outlet orifices 160 at opposite ends, these orifices being controlled by poppet valves 161 actuated in proper timed relation. Fresh air under pressure is supplied from receivers 163, 164 through ducts 165, 166 to the chambers through the respective inlet orifices thereof. Combustible material is introduced into the chambers in any suitable way, as through injection nozzles 167, 168, and the combustible mixture produced within each chamber may be ignited by ignition means, such as spark plugs 169, 170. The exhaust orifices 160 of the chambers lead to exhaust ports 171,172 which are connected by respective exhaust gas conduits 173, 174 to inlet passages 175, 176 leading to passages between the buckets of respective halves of an impulse turbine wheel 177 disposed at approximately the critical location above described and lying within a receiver 178. The ends of the exhaust gas conduits 173, 174 within the receiver are flared so as to form a casing for the turbine wheel, and the wheel is provided with rows of buckets 179 lying between stator vanes 180 mounted on the inner wall of the casing. The turbine wheel casing is formed with an annular outlet 181 leading from the wheel to the interior of receiver 178. Turbine wheel 177 is mounted on a shaft 182 mounted for rotation in suitable bearings and connected to the rotor 183 of a compressor of the axial type. The rotor is provided with rows of buckets 184 between which are stator vanes 185 mounted on the inner wall of the casing of the compressor. The compressor is provided with an inlet 186 and is formed with a pair of outlets 187, 188 conected through conduits 189, 190 to respective receivers 163,164.

An exhaust gas passage 191 leads from receiver 178 to the inlet of an axial type expansion turbine 192. The rotor 193 of the turbine is provided with rows of buckets 194 between which lie stator vanes 195 mounted on the inner wall of the casing of the turbine. The rotor 193 is mounted on a shaft 196 supported in suitable bearings, and the shaft may be coupled to any suitable machine, such as a dynamo 197.

In the operation of the power plant of Fig. 10, the exhaust gases produced in the combustion chambers are explosively exhausted therefrom and drive the impulse turbine wheel 177 which, in turn, drives the rotor 183 of the compressor producing compressed air used to supply the combustion chambers. The dynamic energy retained by the gases issuing from the impulse turbine wheel results in the formation of a static rebounding pressure front which explodes inside receiver 178, and, since the gases rebounding from the explosive pressure front and stored within receiver 178 are prevented by the centrifugal action of the impulse turbine wheel from returning through the wheel, the stored gases are maintained under pressure and are available for operation of the turbine 192 by their expansion. The exhaust conduits 173 and 174 lead inlets 175, 176 to separate halves of the impulse turbine wheel so that the gases in one conduit are not affected by those in the other. The combustion chambers 157, 158 operate to utilize implosive inlet as well as explosive exhaust, so that the chambers are self-cleaning and self-charging, and by supplying the chambers with fresh air under pressure from receivers 163, 164, the pressure level throughout the entire system is raised and both the impulse and expansion turbines have a greater output.

Figure 11:
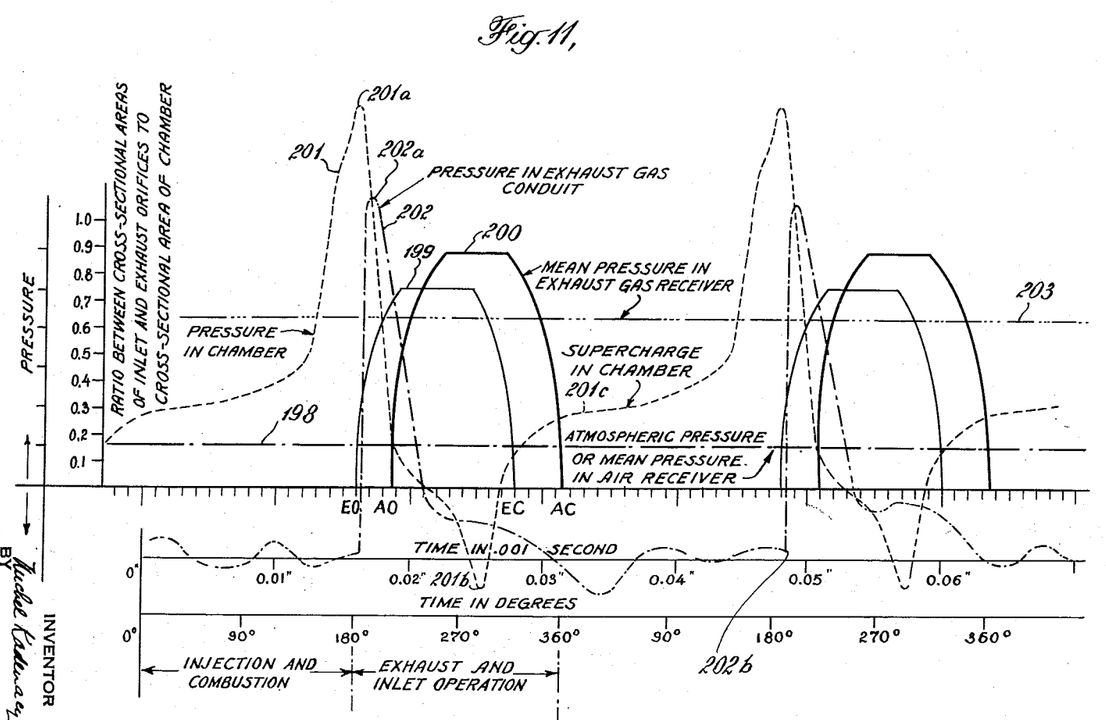
Fig. 11 is a graph illustrating the operation of a typical power plant of the invention.

The operation of a typical power plant containing a single combustion chamber and constructed and operated in accordance with the invention is graphically illustrated in Fig. 11 of the drawings. In the figure, the ordinates represent gaseous pressures with respect to some of the curves, and in others, the ordinates represent the areas of the exhaust and inlet ports opened by the exhaust and inlet valves expressed in terms of the ratios between the areas opened to effect explosive exhaust and implosive inlet and the transverse cross-sectional area of the combustion chamber. The abscissae represent time expressed in terms of 1/1000 of a second or of degrees of rotation of mechanical devices, such as shaft 162 (Fig. 10), which operate during one complete revolution to open and close the exhaust and inlet orifices.

In Fig. 11, the line 198 represents either atmospheric pressure or the mean pressure in the air receiver, such as receiver 51 (Fig. 1), from which air is supplied to the combustion chamber. The curve 199 is a time-area diagram showing the area of opening and the times of opening and closing of the exhaust orifices of the combustion chamber, the start of the opening of the exhaust orifices being indicated at Eo and the complete closing of the orifices being indicated by EC. Curve 200 is a similar curve illustrating the area of opening and the times of opening and closing of the inlet orifices of the chamber. The start of opening of the inlet orifices is indicated at Ao and the complete closing of the orifices is indicated at AC. The ordinates of the time area diagrams represent the ratios of the open areas of the respective orifices to the cross-sectional area of the chamber.

The curve 201 represents the apparent gaseous pressures within the combustion chamber during the cycles of operation, and the curve 202 indicates the apparent gaseous pressures in the exhaust gas conduit at a point close to the exhaust orifices. Curves 201 and 202, accordingly, show the pressure conditions at the respective positions indicated, during explosive exhaust and implosive inlet. The gaseous pressures within the chamber and exhaust conduit may be determined in any known manner, as, for example, by the use of a cathode ray oscillograph.

As indicated by curve 199 of Fig. 11, the exhaust port of the chamber begins to open at approximately the time that the gaseous pressure within the chamber is at its maximum or peak value as a result of the burning of the combustible charge. During the opening of the port, there is a sharp pressure impulse and shock at the assumed point of measurement within the exhaust gas conduit, as indicated by the peak 202a of curve 202. As the exhaust port opens fully and remains open, the apparent pressure within the conduit falls below the inlet pressure, remaining below that pressure until the curve starts to rise sharply again from the point 202b as a result of the next explosive exhaust. The pressure within the conduit is kept relatively low, following the travel of the explosively exhausted mass of burned gases past the point of measurement in the conduit, by the action of the impulse turbine wheel, which operates by its momentum to draw gases from the conduit.

In the installation, the performance of which is represented by the curves, the pressure in the combustion chamber, after reaching the peak 201a, falls rapidly as a result of the explosive exhaust, until the maximum apparent depression within the chamber, represented by the point 201b, occurs. When there is such an apparent depression within the chamber, the inlet orifices are opened so that implosive inlet is obtained. The control means for the inlet orifices are so constructed and operated as to close those orifices after the exhaust orifices are closed with the result that there is a rise in pressure within the chamber and the chamber is supercharged, as indicated by the raised and flattened portion of the curve designated 201c. The mean pressure in the exhaust gas receiver beyond the impulse turbine is indicated by the line 203. The actual pressure within the receiver fluctuates because of the intermittent introduction into the receiver of exhaust gas masses.

Figure 12:
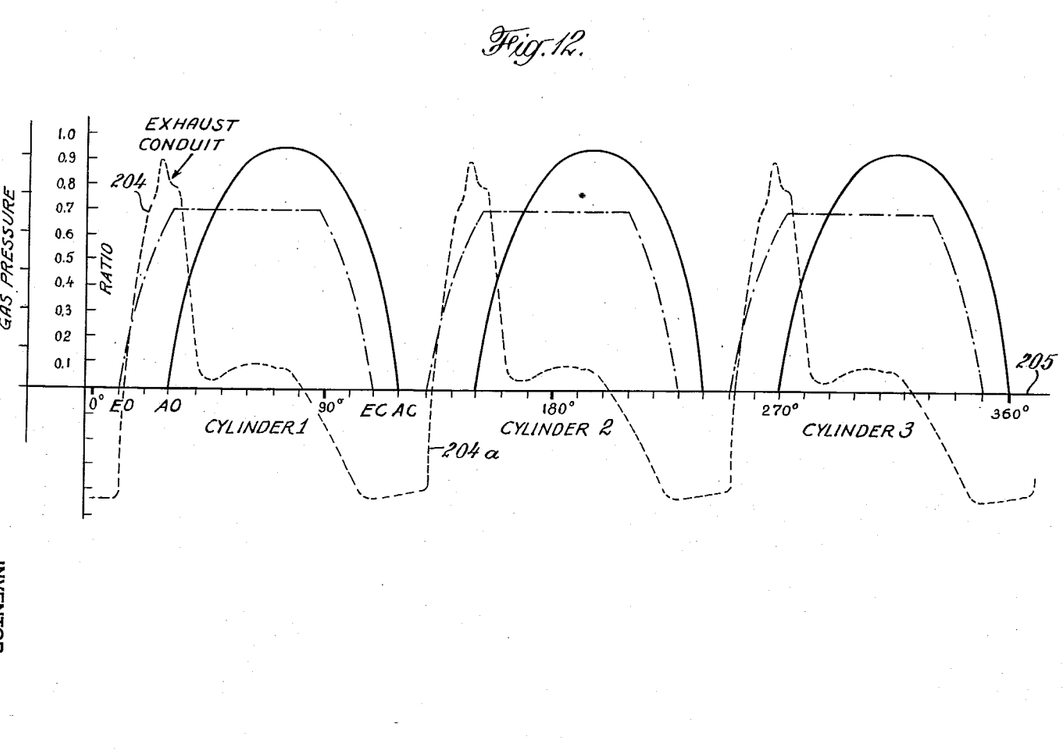
Fig. 12 is another graph showing the operation of a power plant of the invention having three combustion chambers or cylinders.

The operation of a typical power plant of the invention which includes the three cylinders of an internal combustion engine connected to a single exhaust gas conduit, is illustrated in Fig. 12, in which the curve 204 represents pressures in the conduit at a point close to the combustion chambers. The operation of the inlet and exhaust orifices of the individual cylinders is indicated in terms of degrees of rotation of the engine crankshaft. Curve 204 represents the pressures in the exhaust gas conduit adjacent the cylinders, and it will be noted that, when the pressure in the conduit has fallen below the base pressure indicated by the line 205, the conduit pressure remains below the base pressure throughout the part of the curve indicated at 204a, until explosive exhaust in the second cylinder has begun. The depression within the conduit, indicated by the part 204a of the pressure curve, is that left behind following the passage of the exhaust gas mass through the conduit and it is maintained by the action of the turbine wheel in preventing the return of the gases through the wheel and in drawing inlet gases out of the conduit.

Figure 15:
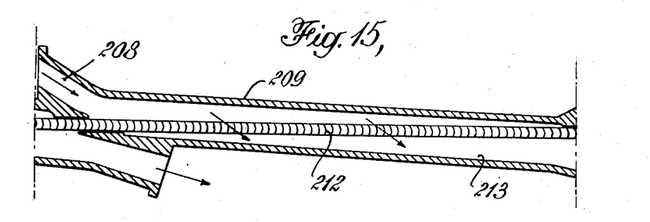
Fig. 15 is a view showing a development of the passage through the turbine of Fig. 13.

The power plant illustrated in Figs. 13 to 15, inclusive, comprises an internal combustion engine of the two cycle type having a cylinder 205 provided with exhaust orifices and an exhaust port at its upper end. An exhaust gas conduit 207 leads from the exhaust port to the inlet 208 of an impulse turbine, the casing 209 of which encloses a turbine wheel 210 located at approximately the critical location above described and mounted on a shaft 211 rotating in suitable bearings. The wheel is provided with a row of buckets 212 on one face and the gases entering the turbine casing through the inlet pass between the buckets to the outlet 213 which is connected by a pipe 214 to a receiver 215. A pipe 216 leads from the receiver to the apparatus in which the gases from the receiver are to be used. The shaft of the impulse turbine wheel may be connected to the rotor of a compressor (not shown), by which compressed air is supplied through conduit 217 to the inlet orifices of the cylinder 206 of the engine.

It will be observed that the turbine inlet 208 is of spiral form and of gradually decreasing cross-sectional area and the turbine outlet 213 is of spiral form and of gradually increasing cross-sectional area. The cross-sectional areas of the inlet and outlet at the ends thereof are equal and, between those ends, the sum of the cross-sectional areas of the inlet and outlet taken in any transverse plane is the same as that of the inlet and outlet at their ends. The passages between adjacent buckets on the turbine wheel are of uniform cross-sectional area from end to end and the buckets are so shaped as not to present surfaces to the oncoming exhaust gas masses from which those masses could rebound toward the combustion chamber.

The impulse turbine in every form of the new power plant provides a free passage for exhaust gas masses therethrough and those masses, accordingly, encounter only minimum resistance offered by inert gas in their travel through the turbine per unit of length of such travel. The impulse turbine is acted on by the exhaust gas masses traveling at full speed from the source of such gases and the turbine abstracts a part of the dynamic energy from the exhaust gas masses, always leaving sufficient dynamic energy therein, so that the exhaust gas masses can push inert gases out of the turbine outlet. This insures that substantially all of each exhaust gas mass will pass entirely through the turbine and the place of explosion of the static rebounding pressure front will be beyond the turbine outlet. The turbine acts in each power plant of the invention both to prevent the return therethrough of gases rebounding from the exploding pressure front and of gases stored under pressure beyond the turbine and also to draw out of the exhaust gas conduit fresh inlet gases which have entered the conduit during the period when both the inlet and exhaust orifices were open. Also, in each form of the new power plant, the wheel of the impulse turbine is so located along the path of travel of the exhaust gas masses leaving the combustion chamber that the masses act upon the turbine wheel when the masses have their maximum speed and dynamic energy.

In the annexed claims, the term "combustion chamber" is intended to refer to a chamber of constant or substantially constant volume. As the piston in a two cycle internal combustion engine moves through only a small part of its stroke during effective exhaust and inlet, when the engine is operating with explosive exhaust and implosive inlet, the cylinder of such an engine may be considered to be of substantially constant volume. Accordingly, the term "combustion chamber" is to be understood as comprehending the cylinder of such an engine unless the contrary clearly appears. Also in the claims, the term "free passage" is intended to refer to a passage through which an exhaust gas mass may travel without encountering any resistance except that offered by inert gases, of which the passage contains the minimum permissible volume. Such a free passage may be provided in the power plant of the invention by the exhaust gas conduit leading from the combustion chamber, by the impulse turbine, or by the conduit leading from the impulse turbine outlet. In the impulse turbine, a free gas passage is one fulfilling the requirements above set forth and made up of an inlet, the total space between the buckets of the wheel through which exhaust gas masses from the inlet pass, and an outlet from the turbine.

The claims are:

1. In a power plant comprising a combustion chamber in which successive charges of a combustible mixture are burned, the chamber having inlet and exhaust ports, and means for controlling the respective ports to cause each mass of burned gases within the chamber to be accelerated and leave the chamber at high velocity as a mass during explosive exhaust of the gases from the chamber, after which a fresh gaseous charge is admitted into the chamber, the combination of an exhaust gas conduit leading from the chamber and containing inert gases, the conduit providing a free passage therethrough for exhaust gas masses made up of burned gases and inert gases within the conduit which are accelerated by the burned gases during the period of acceleration of the latter, the exhaust gas masses accelerating, compressing, and displacing inert gases in their travel through the conduit, and an impulse turbine including a casing having an inlet connected to the end of the conduit and an outlet, and a turbine wheel within the casing provided with buckets and rotated by gases passing through the casing, the wheel lying substantially at the point reached by the acceleration front traveling through the gases in the conduit and inlet at the instant the burned gases cease reacting against the chamber walls and begin to leave the chamber as a mass in explosive exhaust, the inlet, the outlet, and the spaces between the buckets of the turbine wheel defining a free passage for exhaust gas masses.

2. In a power plant comprising a combustion chamber in which successive charges of a combustible mixture are burned, the chamber having inlet and exhaust ports, means for controlling the respective ports to cause each mass of burned gases within the chamber to be accelerated and leave the chamber at high velocity as a mass during explosive exhaust of the gases from the chamber, after which a fresh gaseous charge is admitted into the chamber, and an exhaust gas conduit leading from the chamber and containing inert gases, the conduit providing a free passage therethrough for exhaust gas masses made up of burned gases and inert gases within the conduit which are accelerated by the burned gases during the period of acceleration of the latter, the exhaust gas masses accelerating, compressing, and displacing inert gases in their travel through the conduit, the combination of an impulse turbine including a casing having an inlet connected to the end of the conduit and an outlet, a turbine wheel within the casing rotated by gases passing through the casing, the wheel being at substantially the point reached by the acceleration front traveling through the gases in the conduit and inlet at the instant the burned gases cease reacting against the chamber walls and begin to leave the chamber as a mass in explosive exhaust, the inlet, the spaces between the buckets of the turbine wheel, and the outlet providing a free passage for exhaust gas masses, a shaft to which the wheel is attached, and a rotary device connected to the shaft and driven thereby as the wheel drives the shaft.

3. In a power plant comprising a combustion chamber in which successive charges of a combustible mixture are burned, the chamber having inlet and exhaust ports, and means for controlling the respective ports to cause each mass of burned gases within the chamber to be accelerated and leave the chamber at high velocity as a mass during explosive exhaust of the gases from the chamber, after which a fresh gaseous charge is admitted into the chamber, the combination of an exhaust gas conduit leading from the chamber and containing inert gases, the conduit providing a free passage therethrough for exhaust gas masses made up of burned gases and inert gases within the conduit which are accelerated by the burned gases during the period of acceleration of the latter, the exhaust gas masses accelerating, compressing, and displacing inert gases in their travel through the conduit, a receiver and an impulse turbine within the receiver having an inlet connected to the exhaust gas conduit, a wheel, and an outlet leading to the remainder of the receiver, the wheel being rotated by the action of successive exhaust gas masses therethrough and lying approximately at the point reached by the acceleration front traveling through the conduit and inlet at the instant the burned gases cease reacting against the chamber walls and begin to leave the chamber as a mass in explosive exhaust, the turbine inlet, the spaces between the buckets of the turbine wheel, and the turbine outlet providing a free passage for exhaust gas masses, and a prime mover connected to the receiver and operated by gases issuing therefrom.

4. In a power plant comprising a combustion chamber in which successive charges of a combustible mixture are burned, the chamber having inlet and exhaust ports and means for controlling the ports to cause each mass of burned gases within the chamber to be accelerated and leave the chamber at high velocity as a mass during explosive exhaust of the gases from the chamber and to admit a fresh gaseous charge into the chamber, the combination of an exhaust gas conduit leading from the chamber and containing inert gases, the conduit providing a free passage therethrough for exhaust gas masses made up of burned gases and inert gases within the conduit which are accelerated by the burned gases during the period of acceleration of the latter, the exhaust gas masses accelerating, compressing, and displacing inert gases in their travel through the conduit, a receiver, means within the receiver defining a turbine casing having an inlet connected to the outer end of the conduit and an outlet leading into the interior of the receiver, and an impulse turbine wheel within the casing, the wheel having buckets and being rotated by successive exhaust gas masses passing through the casing into the receiver and the wheel lying at approximately the point reached by the acceleration front traveling through the gases in the conduit and inlet at the instant the burned gases cease reacting against the chamber walls and begin to leave the chamber as a mass in explosive exhaust, the inlet, the spaces between the buckets of the turbine wheel, and the outlet providing a free passage for exhaust gas masses.

MICHEL KADENACY.

REFERENCES CITED

The following references are of record in the file of this patent:

UNITED STATES PATENTS

| Number | Name | Date |
|---|---|---|
| 810,252 | De Bonnechose | Jan. 16, 1906 |
| 1,931,545 | Holzwarth | Oct. 24, 1933 |
| 2,010,823 | Noack | Aug. 13, 1935 |
| 2,047,928 | Haring | July 14, 1936 |
| 2,167,303 | Kadenacy | July 25, 1939 |
| 2,198,679 | Radelet et al. | Apr. 30, 1940 |
| 2,198,730 | Kadenacy | Apr. 30, 1940 |
| 2,292,288 | Pateras Pescara | Aug. 4, 1942 |
| 2,522,118 | Kadenacy | Sept. 12, 1950 |

FOREIGN PATENTS

| Number | Country | Date |
|---|---|---|
| 74,526 | Austria | Aug. 26, 1918 |
| 111,381 | Great Britain | Nov. 29, 1917 |
| 456,989 | Great Britain | Sept. 16, 1936 |
| 591,372 | France | Apr. 8, 1925 |
| 626,976 | France | May 28, 1927 |